United States Patent Office 3,442,822
Patented May 6, 1969

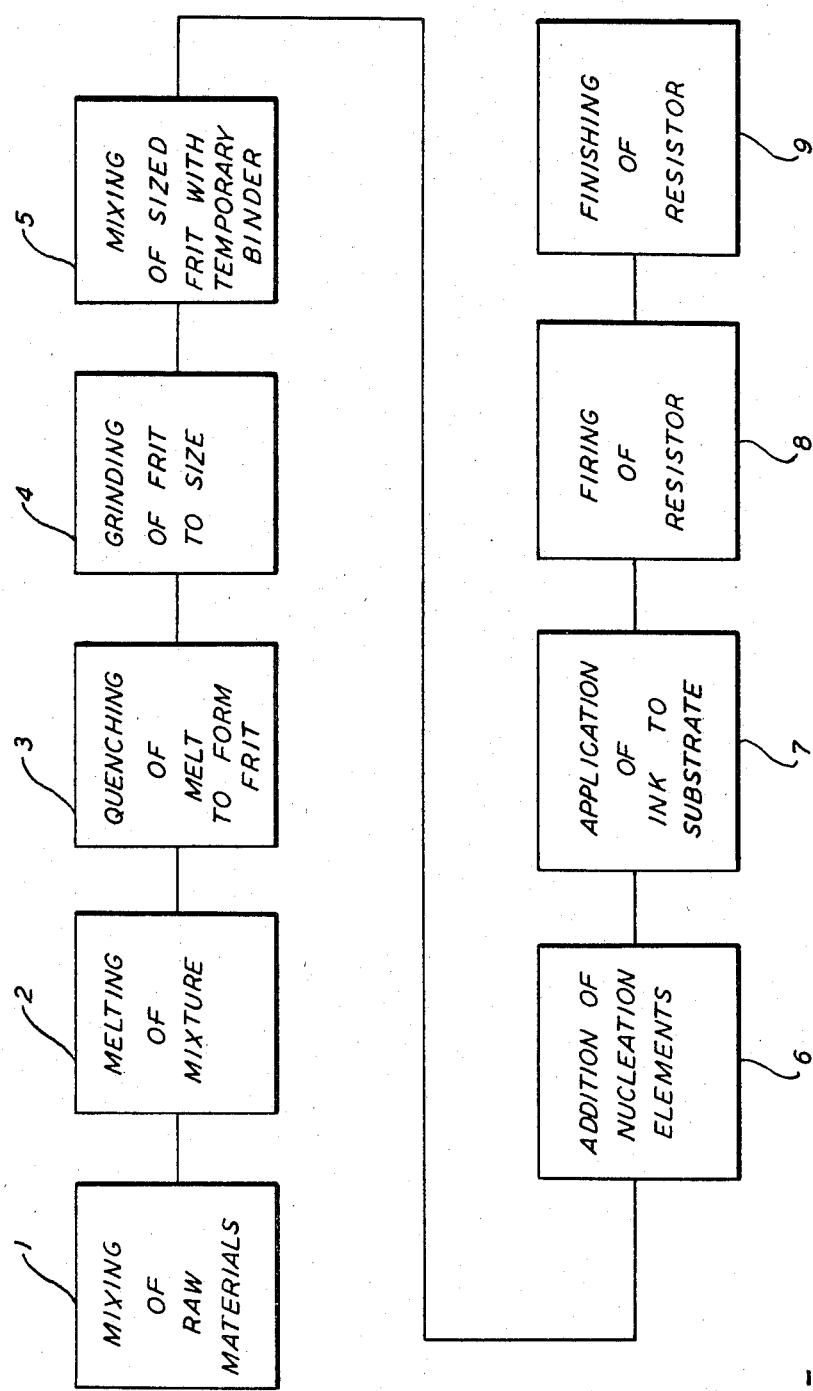

3,442,822
METHOD OF MAKING ELECTRICAL RESISTOR BY RECRYSTALLIZATION
Kee Hyong Kim, Niagara Falls, N.Y., assignor to Air Reduction Company Incorporated, New York, N.Y., a corporation of New York
Continuation-in-part of application Ser. No. 286,202, June 7, 1963. This application Dec. 22, 1965, Ser. No. 515,539
Int. Cl. H01b 1/08, 3/08; B01d 9/00
U.S. Cl. 252—518   6 Claims

ABSTRACT OF THE DISCLOSURE

Disclosed is a method of making glass bonded, conductive metal oxide resistor compositions by a recrystallization process involving heating a mix of metal oxide such as, for example thallium oxide, and glass to dissolve the metal oxide therein, cooling and then reheating to precipitate crystallites of conductive metal oxide uniformly dispersed in the composition.

---

This application is a continuation-in-part of my copending application Ser. No. 286,202, now Patent No. 3,238,151 filed June 7, 1963, and entitled, Resistor Manufacture.

This application relates to conductive compositions suitable for resistors and to a method of making electrical resistors, and more particularly relates to inorganic composition resistors and to a method of making resistors by a recrystallization process. The term "resistor" is used in a broad sense to designate (1) flat films or coatings applied by screen-printing, spraying, or dipping an insulator; (2) applications to cylindrical substrates in spiral fashion or with subsequent mechanical spiraling; and (3) volumetric resistors.

A recent development in electrical resistors has been the use of conductive particles selected from various metals and/or metal oxides dispersed in a glass matrix to form a conductive composition. This conductive composition, referred to herein as an inorganic resistor composition, has many desirable physical and electrical characteristics. Such resistor compositions and their characteristics are disclosed, for example, in United States Patents Nos. 3,052,573 and 3,180,841, and in my copending applications Ser. Nos. 428,525, now Patent No. 3,352,797 and 428,535, now abandoned filed concurrently on Jan. 27, 1965.

The conventional manner for making inorganic composition resistors appears to be an admixture process which comprises the steps of mixing a glass frit with metal and/or metal oxide particles and a suitable temporary binder to form a paste, applying the paste to an insulating base, and firing the coated base to fuse the mixture and bind it to the base.

The conventional method of making inorganic composition resistors is subject to several disadvantages. The temperatures at which the mixtures are heated to fuse the conductive particles to the glass is such that the size of the particles in the fused mixture remains essentially the same as when mechanically mixed with the glass. Since these metal or metal oxide particles from a practical standpoint are no less than about 1μ in size, it is extremely difficult to get the ultimate uniform dispersion of the particles in the glass to form a homogeneous mixture. The lack of homogeneity increases the likelihood of discontinuities occurring in conductive paths within the resistor body and lowers the reproducibility which may be obtained from the prior art process. It is therefore essential that a process be developed which can be utilized to produce a homogeneous inorganic composition resistor which has a very fine grained uniform structure free from porosity.

I have discovered a method of making inorganic composition resistors wherein the conductive metal and/or metal oxide particles can be grown within the glass matrix. This process, which I shall term a recrystallization process, allows one to control the size and distribution of the conductive particles by varying the temperature of recrystallization and/or the time of heat application in the recrystallization step in a manner which will be described in detail hereinafter.

By utilizing the recrystallization process, conductive particles which are at least as small as 100 A. may be grown within the glass matrix. The extremely fine particles are uniformly dispersed within the glassy phase to form an essentially nonporous homogeneous conductive composition. The homogeneity of the mixture results in the production of resistors which have a low noise level, a low voltage coefficient, and excellent reproducibility. Discontinuities in the conductive paths are reduced and current flow is more uniform in density.

A further advantage of my recrystallization process which will become apparent from the following description is that the process enables one to use conventional glass working techniques.

Briefly stated, the novel process of this invention resides in mixing suitable proportions of metal oxides with the glass, heating the mixture to a temperature at which the metal oxide forms an amorphous solution with the glass frit, and quenching the solution to form an amorphous solid material which is nonconductive. The nonconductive material may then be rendered conductive by heating the body to a temperature and in a manner as will be described hereinafter to precipitate metal oxide particles within the amorphous solid solution.

An object of this invention is to provide a method of making a conductive body by a recrystallization process.

A further object of this invention is to provide a method of making an inorganic resistor and resistor composition by recrystallization in situ of metals and/or conductive metal oxides within an amorphous solid solution of such metals and/or conductive metal oxides and glass.

An additional object of the invention is to provide a conductive composition comprising thallium oxide and glass by recrystallization of the thallium oxide in situ within an amorphous solid solution of thallium oxide and glass.

Other objects, features, and advantages of the invention will appear or be pointed out as the description proceeds with reference to the annexed drawings in which:

The figure illustrates a block diagram of one method of making resistors by my recrystallization process.

As previously pointed out, inorganic resistors comprise as essential ingredients conductive particles of one or more metal and/or metal oxides dispersed in a glass matrix. One outstanding combination of ingredients to form resistors is thallium oxide particles and borosilicate glass as is described and claimed in my aforementioned application Ser. No. 286,202, and as will be pointed out hereinafter, this and many other inorganic resistor compositions can be rendered conductive by my novel recrystallization process.

The glass used in my process is preferably a borosilicate glass, and particularly a lead borosilicate glass; for example, a glass with constituents in the following ranges:

| | Weight percent |
|---|---|
| PbO | 45–85 |
| $B_2O_3$ | 2–19 |
| $SiO_2$ | 7–40 |
| $Al_2O_3$ | 0–3 |
| $Na_2O$ | 0–5 |
| Alkali earth oxides (CaO, MgO, SrO, BaO) | 0–10 |

In addition to lead borosilicate glass, the glass used in the resistor composition may be any conventional borosilicate glass, phosphate glass, and other low melting glasses; for example, chalcogenide glasses. It has also been found that many of these glasses, such as given in the example above, may advantageously be modified by including in the glass up to 10% zinc oxide.

Although it is not essential, I have also found it beneficial to utilize as nucleation agents up to 10% or more noble metals or their oxides in the resistor mix to promote and control the growth of crystals within the solid solution.

In some instances, the mix may contain dopants such as antimony oxide, tungsten oxide, and titanium dioxide in quantities of up to 10% to effect the free conductivity of the crystalline phase by varying the number of charge carriers.

The function of nucleation agents and dopants is well known in the prior art and requires no further explanation.

The essence of my invention resides in the discovery that if metal oxides and glass frits, including the foregoing amorphous glass frit and thallium oxide mixes, are heated sufficiently high to go completely into solution together, the resulting solution can be cooled and then recrystallized by heating to form a precipitated metallic oxide phase within the supercooled glass. In the case of the glass frit and thallium oxide mixes, I have found it preferable to bring the mix to a temperature of 1000° C. to 1400° C. in order to produce a solution. This solution, when cooled rapidly, retains completely amorphous characteristics, being translucent and in a supercooled liquid state. I then reheat the composition and allow sufficient time for recrystallization action to precipitate out the thallium oxide as minute crystallites forming an opaque black mass.

The crystalline structure within this black glass makes the composition electrically conductive and highly useful as a resistor in film, coat, or filled form.

More conveniently, into a body of glass already in the molten state, I dissolve an amount of thallium oxide according to the foregoing frit and thallium oxide proportions, the temperature of the solution being in the range between approx. 750° C. and 1000° C. The solution is cooled rapidly to reach a supercooled solution state, as by filling individual small die cavities therewith, and then recrystallization is accomplished by bringing the temperature into a preferred range between 200° C. and 650° C. for a reheat period between 5 min. and a few days. If the small die cavities mentioned are provided with wire lead terminals projecting thereinto, the resulting individual bodies will have their resistor terminals permanently locked in situ as cast. In any case, a uniform, stable, conductive composition results.

As previously pointed out, the novel recrystallization process of this invention may be utilized to manufacture either volumetric resistors or resistors which consist of a layer of conductive material deposited on an insulated substrate. In the latter case, referring to the figure, conductive particles selected from various metal and/or metal oxides are mixed with suitable glass frit as at 1. The mixture is heated until it forms an amorphous solution of the conductive particles and glass at 2. The amorphous solution is quenched as at 3 by a suitable manner such as dumping the solution into a container of water to form a frit. The fritted material is then ground at 4 to a predetermined size such as, for example, −325 mesh. The sized material is then mixed with a temporary binder such as butyl Carbitol and/or ethyl cellulose so that an ink suitable for printing, spraying, dipping, etc., is obtained. Nucleation agents such as sliver, iridium, platinum, etc., or the oxides thereof, may be added to the ink at 6 if desired. It should also be noted that the nucleation agent could be added to the mix at 1, thereby eliminating the step shown at 6. The ink is then printed on, or otherwise applied to, a suitable substrate at 7 and fired at 8 to a temperature and for a length of time at which conductive crystals of desired sizes are grown within the vitreous body. The resistor is then finished in a conventional manner at 9. The resistor may, for example, take the form of the resistor disclosed in the McKeand et al. copending application Ser. No. 488,664, now Patent 3,228,317 assigned to the assignee of the present application.

The following Examples 1–5 are specific examples of printed resistors formed by the recrystallization process described above. Unless otherwise specified, all proportions referred to herein are proportions by weight.

EXAMPLE 1

In this example, 68.6% finely divided particles of thallium oxide, 2% finely divided particles of silver oxide as a nucleation agent, and 29.4% borosilicate glass frit were mixed together and heated to a temp. of 900° C., wherein the thallium oxide and silver oxide went into solution with the glass frit. The amorphous solution was then fritted into water and ground to −325 mesh size. The sized particles of amorphous frit were then formed into a printing ink by the addition of approx. 10% butyl carbitol and ethyl cellulose in a 1:1 mixture. The inks were then printed on a titanate substrate and dried at 110° C. for ½ hr. The resistor was then fired for 1 hr. in a tunnel kiln to a peak recrystallization temperature of 340° C. Suitable terminals were then applied to the resistive ends of the printed composition by coating with a silver paste. The resistor formed and produced with this method had the following characteristics:

| | |
|---|---|
| Sheet resist. (KΩ/□) | 7.34 |
| TCR (p.p.m./° C.) | −490 |
| VCR (percent/v.) | −0.0099 |
| Noise (d.b.s.) | −10.1 |

EXAMPLE 2

A resistor was prepared from the same composition and following the same procedure as set forth in Example 1 except that the printed resistor was fired for 1 hr. and to a peak temperature of 355° C. The resistor so produced exhibited the following properties:

| | |
|---|---|
| Sheet resist. (KΩ/□) | 2.26 |
| TCR (p.p.m./° C.) | −310 |
| VCR (percent/v.) | −0.0098 |
| Noise (d.b.s.) | −19.8 |

EXAMPLE 3

A mixture of small particles in the proportion of 55.6% thallium oxide, 7.3% silver oxide, and 37.1% borosilicate glass frit, was processed as in Example 1 except that the printed resistor was fired for 11 min. and to a peak temperature of 350° C. The resistor so formed exhibited the following properties:

| | |
|---|---|
| Sheet resist. (KΩ/□) | 5.2 |
| TRC (p.p.m./° C.) | −7550 |
| VCR (percent/v.) | −0.0045 |

EXAMPLE 4

A resistor was formed as in Example 3 except the printed resistor was fired for 11 min. and to a peak temperature of 400° C. The resistor so formed exhibited the following properties:

Sheet resist. (KΩ/☐) _____ 20.5
TCR (p.p.m./° C.) _____ −170
VCR (percent/v.) _____ −0.0027

EXAMPLE 5

A mixture of fine particles of 48.5% tin oxide, 48.5% borosilicate glass, and 3.0 antimony oxide was melted to form an amorphous solution by heating to 1500° C. for 20 min. The melt was fritted by dumping into a container of water. The fritted material was milled to a −325 mesh size, and the sized material was mixed with approx. 10% of a 1:1 butyl carbitol and ethyl cellulose mixture to form an ink suitable for printing. The ink was printed on a forsterite substrate and fired to a recrystallization temperature of 700° C. for 11 min. Suitable terminals were attached to the end of the printed resistor. The resistor so formed exhibited a resistance of 1 megohm/sq. and a temperature coefficient of resistance of −5400 p.p.m./° C.

In addition to the printed resistors described above, my recrystallization process, as previously pointed out, is particularly adapted to the formation of volumetric resistors. The following are examples of the manufacture of volumetric resistors and recrystallization.

EXAMPLE 6

Fine particles in the proportion of 68.6% thallium oxide, 29.4% lead borosilicate glass, and 2% silver oxide as a nucleation agent were mixed and melted to form an amorphous solution by heating to 1000° C. The melt was then quenched by pouring into a steel die in which metal wire leads were preset on both ends of the cylindrical die. The steel die was preheated in order to reduce the thermal shock effect. The temperature of the die was approximately 200° C. at the time the melt was poured. The preheating of the die is not essential and may be varied as desired. The resulting amorphous body was recrystallized by heating to a temperature of 355° C. for 1 hr. The approx. slug size was a cylinder 1.7 cm. long and having a diam. of 1.7 cm. The slug exhibited the following properties:

Sheet resist. (KΩ/☐) _____ 2.26
TCR (p.p.m./° C.) _____ −310
VCR (percent/v.) _____ −0.0098

EXAMPLE 7

Fine particles in the proportion of 75% tin oxide, 20% borosilicate glass, and 5% titanium dioxide were mixed and melted to form an amorphous solution by heating to 1400° C. for 10 min. in a kyanite crucible. The melt was then quenched by pouring into a steel die as in Example 6. The resulting amorphous body was recrystallized by heating to a temp. of 700° C. for 15 min. to form a conductive slug resistor which exhibited a resistance of 4.21K ohm/cm. and a TCR of −600 p.p.m./° C. Instead of titanium dioxide, tungsten oxide may be substituted. In either case, the oxide acts as a dopant to control semiconductive properties as is well known in the prior art.

EXAMPLE 8

Fine particles in the proportion of 10% each of $Fe_2O_3$, CuO, NiO, and $Mn_2O_3$, and 60% borosilicate glass were mixed and melted by heating to 1500° C. for 1 hr. to form an amorphous melt. The melt was then quenched as in Example 6 by pouring into a steel die. The resulting amorphous slug was recrystallized by cooling to room temperature, approx. 100° C./min. The resistance of the slug was 43.2 ohm/cm. and the TCR was −2200 p.p.m./°C.

It is to be understood that the foregoing specific examples are intended to in no way limit the scope of my recrystallization process. Obviously the process may be advantageously applied to many other inorganic resistor compositions.

The ratio of conductive particles to glass varies depending mainly upon the particular metal or oxide which is selected for the composition. The amount of conductive particles present must be at least enough to precipitate out of the supercooled solution, whereas sufficient glass must be present which will act as a glass former. For example, in the case of thallium oxide it has been found that satisfactory formation of conductive paths cannot be formed unless at least 30% thallium oxide is present in the glass.

Other metal oxides, such as iron compound, will precipitate out of the supercooled solution to form a conductive body even though the mix contains as little as 10% of the metal oxide. On the other hand, it has been found that at least 50% stannous oxide must be present in the mix before it will precipitate out of the supercooled solution and form a conductor.

It has also been found that, with the exception of the thallium oxide-glass mix, at least 5% glass must be present in the mix to produce the glassy phase. In the thallium oxide and glass frit mix, while 9% glass is preferred, only 1% glass is required as a glass former. The reason less glass is required in the case of the thallium oxide-glass mix than in other cases is believed to reside in the fact that thallium oxide itself acts as a glass former.

The optimum recrystallization temperature of conductive oxides from glasses depends upon many factors, such as the particular kind of conductive oxide and glaze composition used and upon the time at which recrystallization temperature is applied. Electron micrographs of the fractured samples of thallium oxide and glass compositions show the appearance of flat cubic thallium oxide crystals at 250° C. to 500° C., and the emergence of dissolution of these crystals at 550° C. Several electrical conductivity measurements indicated that the maximum conductivity was obtained near 500° C. after holding such temperature for a few hours. Overnight holding of the temperature did not substantially increase the conductivity of the composition.

The relative amount of metal oxide present in the composition also affects the time at which the conductive crystals began to precipitate out of the amorphous supercooled solution. Glass saturated with thallium oxide particles has been found to become electrically conductive after heating at 500° C. for as little as 3¾ min.

Generally speaking, stannous oxide begins to recrystallize out of the amorphous solution at temperatures above 600° C. On the other hand, the iron oxide saturated glass required at least 1000° C. to become electrically conductive by recrystallization.

Obviously many modifications and variations of the invention are possible in the light of the above teachings. It is therefore to be understood that within the scope of the appended claims the invention may be practiced otherwise than as specifically disclosed.

I claim:

1. A method of making a glass matrix type resistor composition comprising the steps of heating a mix containing a conductive metal oxide and glass to a temperature at which the metal oxide dissolves completely in the glass, said oxide being chemically stable at said temperature, cooling the solution to form a nonconductive amorphous solid solution and reheating the solution for a reheat period and at a reheat temperature at which the conductive metal oxide precipitates in the solution as uniformly dispersed crystallites of size less than 1 micron, the proportion of said conductive metal oxide present in said mix being chosen so that a sufficient volume of said crystallites will precipitate to provide a stable conductive path through the composition.

2. The method of making an electrical resistor which comprises dissolving a conductive metal oxide in molten glass at a temperature above 750° C. and high enough to cause the conductive oxide to be completely dissolved in the glass, said oxide being chemically stable at said temperature, rapidly quenching the solution to form a substantially nonconductive amorphous solid solution, reducing the material so produced to fine particle size, forming the said particles into the desired resistor configuration and reheating the formed particles to a temperature of from 200–650° C. for more than 5 minutes to cause the conductive metal oxide to precipitate in the glass in a uniform dispersion of conductive metal oxide particles of size less than 1 micron the amount of said conductive metal oxide dissolved in said molten glass being chosen to provide a sufficient volume of said crystallities to form a resistor having a conductive composition of uniform electrical resistivity.

3. The method according to claim 2 in which the desired resistor configuration is achieved by applying the nonconductive fine particles to a nonconductive substrate in the form of an ink made by mixing the said particles with a temporary binder.

4. The method according to claim 2 in which the conductive metal oxide is thallium oxide, said thallium oxide being added to said glass in the amount of at least about 30% by weight of the combined composition.

5. The method according to claim 2 in which the conductive metal oxide is tin oxide, said tin oxide being added to said glass in the amount of at least 50% by weight of the combined composition.

6. The method according to claim 2 in which the conductive metal oxide is a mixture of iron oxide, copper oxide, nickel oxide and manganese oxide, said mixture being added to said glass in the amount of at least about 30% by weight of the combined composition.

References Cited

UNITED STATES PATENTS

| | | | |
|---|---|---|---|
| 3,114,066 | 12/1963 | Allen et al. | 106—39 |
| 3,238,151 | 3/1966 | Kim | 252—518 |
| 3,052,573 | 10/1962 | Dumesnil | 252—518 |

OTHER REFERENCES

Thakur, "Nucleation and Controlled Crystallisation of Glass," Glass and Ceramic Bull. vol. 10, #2 (1963) pp. 51–55.

LEON D. ROSDOL, *Primary Examiner.*

J. D. WELSH, *Assistant Examiner.*

U.S. Cl. X.R.

106—39; 117—201, 229; 252—519, 520